March 31, 1953     H. C. NOE     2,632,995
FLUID ENERGY TRANSMISSION, CONVERSION AND
STORAGE SYSTEM AND POWER CYCLE THEREFOR
Filed Dec. 23, 1948
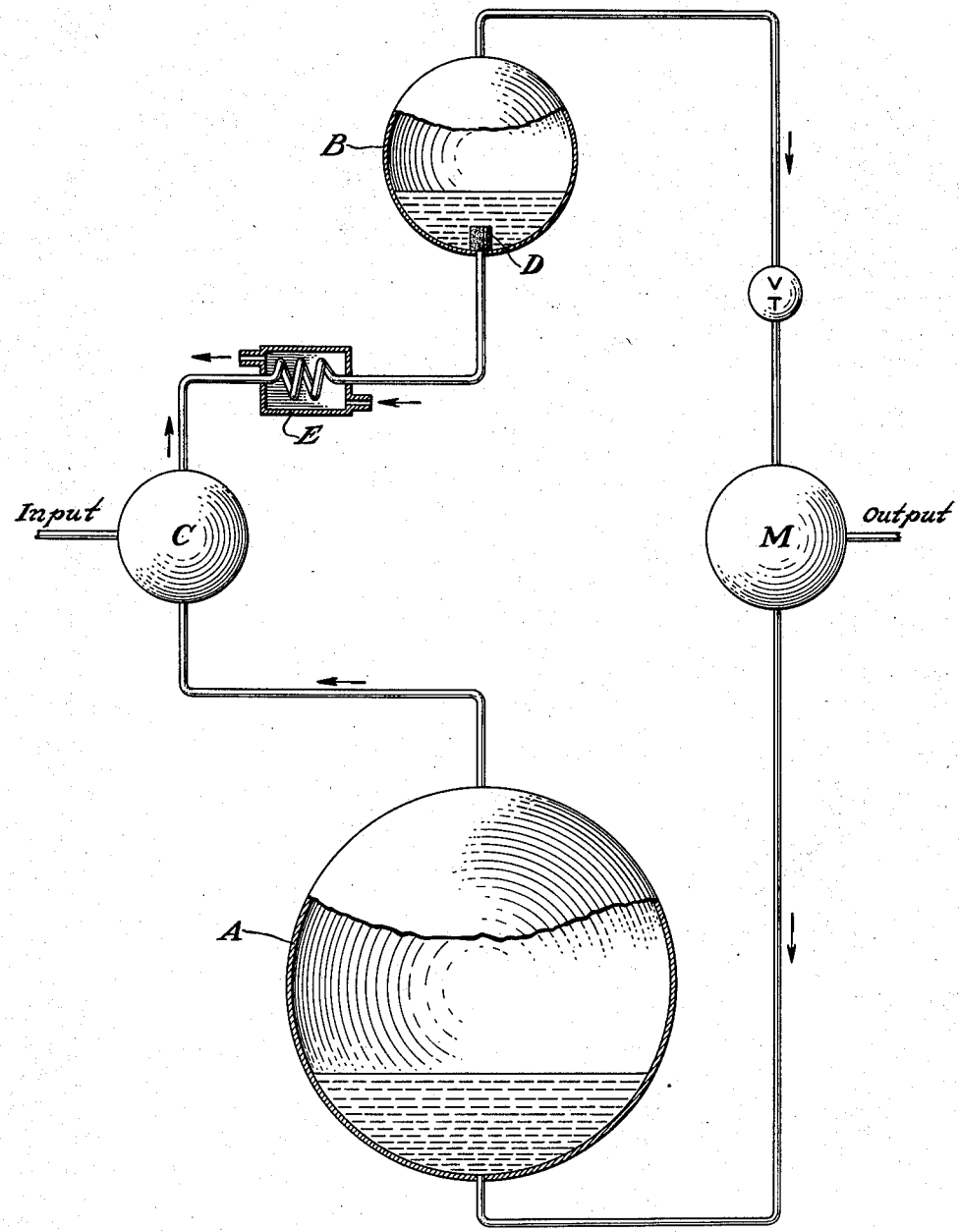
INVENTOR.
Harold C. Noe
BY
J. William Carson
ATTORNEY Patented Mar. 31, 1953

2,632,995

UNITED STATES PATENT OFFICE 2,632,995

FLUID ENERGY TRANSMISSION, CONVERSION, AND STORAGE SYSTEM AND POWER CYCLE THEREFOR

Harold C. Noe, Upper Montclair, N. J.

Application December 23, 1948, Serial No. 67,064

7 Claims. (Cl. 60—36)

The present invention relates to fluid systems for the transmission, conversion and/or storage of energy, and to fluid power cycles for such systems.

More specifically, the present invention relates to an improved fluid power cycle for a fluid system for transmitting, converting and/or storing energy, characterized by the utilization of a foam or foam-like medium as the operating fluid medium.

The invention further relates to a fluid system for the transmission, conversion and/or storage of energy, similarly characterized by the utilization of a foam or foam-like medium as the operating fluid medium.

In the conventional type of fluid system in which compressed air or other gas or vapor is employed as the operating fluid medium, cumbersome, costly and energy wasting cooling systems are required to prevent excessive operating temperatures, due to the high temperatures which result without cooling, even at relatively moderate operating pressures.

I have found that when a foam (which term is to be understood as being a finely divided mixture or dispersion of a gaseous fluid in a liquid or liquid-like medium and in which small volumes of gas are surrounded by thin walls of the liquid to form a myriad of bubbles) is employed as the operating fluid medium, the liquid component of the foam, being in such intimate contact with the gaseous component by reason of the minute subdivision of the gas into countless bubbles, absorbs the heat developed by the compression of the foam, thereby effecting a reduction of the operating temperatures and the power required at every portion of the power cycle, such heat being subsequently given up at another portion of the cycle. Because of the higher specific heat and greater density of the liquid medium, the liquid absorbs many times the quantity of heat absorbed by an equal volume of gas; so that in effect the gas carries its own cooling medium with it.

While early attempts were made in the air compression art to lower the operating temperatures and lessen the power consumption in air compressors by injecting water into the compressor along with the air, a much more efficient operation results from my invention, first, because of the much more intimate contact of the liquid component of the foam with the gaseous component, with consequent greater absorption of the heat of compression by the liquid; and second, because the liquid and the gas are not separated, or required to be separated, subsequent to compression, whereby the heat absorbed by the liquid is retained and not discarded, being given up for the performance of work at another portion of the power cycle. This greater heat absorption of the foam has another important advantage in that subsequent expansion of the foam to perform work does not result in freezing temperatures, as the heat contained in the liquid counteracts the cooling effect of expansion of the gas, and the liquid does not freeze. In the early art, however, where water was injected with the air to lower the operating temperatures and lessen the power consumption, it was necessary to separate the water injected with the air subsequent to the compression portion of the cycle, so as to avoid solid slugs of water; while even in present day compressors moisture already present in the air to be compressed is objectionable because of freezing of the moisture on the expansion portion of the cycle. This important advantage of the present invention results, of course, from the greater heat capacity of the liquid component of the foam as distinguished from the lesser heat capacity of air or other gaseous fluids.

Some of the numerous important advantages that result from the use of foam as the operating fluid medium in a fluid system of the type in question, are as follows: first, that no cooling apparatus is necessary or even desirable on the compression part of the cycle, as the energy which would otherwise be dissipated by cooling can be stored in the foam and utilized in the expansion cycle; second, that each portion of the cycle has its own characteristic and substantially uniform temperature; third, that due to the inherent heat insulating quality of the foam, the heat loss from and through the foam is reduced to a minimum; and fourth, that by utilizing a foam having as the liquid component a liquid having lubricating qualities, the fluid system can be made self-lubricating.

The power cycle of the present invention can be used wherever compressed air is now used in a power cycle, but without the enormous waste of energy usually attendant upon the use of that medium and without the drawbacks due to freezing upon expansion; and it can also be used in many places where hydraulic transmissions are now employed. Thus, a fluid transmission system in accordance with the present invention can be used to replace variable speed and variable load drives, and can be adapted to serve as highly effective automotive and rail car transmissions, doing away with many expensive parts and, because of its energy storage possibilities, employing a smaller motor than the conventional automotive or rail car power plant.

The primary object of the present invention is accordingly the provision of a fluid energy cycle for the conversion and/or storage of energy and in which a foam or foam-like medium is employed as the operating fluid medium, whereby due to the presence of a liquid heat absorbing film surrounding minute volumes of gas and in intimate contact therewith, energy may be stored in both the gas and the liquid and thereafter utilized in a varying or a continuous power cycle, without substantial loss of any of the energy.

Another object of the invention is the provision of a fluid energy transmission, conversion and/or storage system in which elaborate cooling apparatus is not required.

Still another object of the invention is the provision of a fluid energy transmission, conversion and/or storage system in which the rate of use of energy may be varied at will, and in which the output may at times exceed the input, due to the feature of storage of energy.

A further object of the invention is the provision of a fluid energy transmission, conversion and/or storage system with extreme flexibility for both input and output at all operating ranges, and at a very high efficiency.

A still further object of the invention is the provision of a fluid energy cycle employing a foam or foam-like medium as the operating fluid medium for use wherever a fluid medium is employed in a fluid system.

These and other objects of the invention will be more fully apparent as the description proceeds in conjunction with the accompanying drawing, wherein the single figure represents schematically a fluid energy transmission, conversion and storage system in accordance with the invention.

Referring to the drawing, a compressor C, which may be driven by any suitable source of power (not shown), compresses foam (that is, the gaseous component of foam) supplied to it from a low pressure reservoir A and delivers it under high pressure to a high pressure reservoir B, from which the compressed foam is delivered through a suitable throttle valve VT to a motor or engine M, which is connected to the work to be done. Upon the compression of the fluid in the compressor C, both the pressure and the temperature of the fluid are raised, thus increasing the energy stored in the fluid, while upon the expansion of the fluid in the motor M, the pressure and temperature of the fluid are lowered, thus decreasing the energy stored in the fluid. The fluid is thereupon returned to the compressor C for recycling; and the cycle may be continuous or intermittent.

The units of my system may be connected at some distance from each other; and depending upon the specific use intended, the system may or may not contain high and low pressure reservoirs.

The foam cycle of the present invention may be compared to a combination of a thermodynamic cycle, such as a steam cycle, and a hydraulic cycle, as in a hydraulic transmission. Since in a steam cycle the latent heat of vaporization is discarded, the maximum efficiency will be attained when the temperature of the steam producing boiler is highest and the temperature of the exhaust is lowest. In a hydraulic system, the higher the initial pressure is, the higher the efficiency will be due to the losses involved in otherwise moving larger quantities of liquid at lower pressures. In the foam cycle, however, by adjusting the relative quantities of the gaseous fluid and the high heat absorbing liquid, it is possible to operate on both a thermodynamic cycle and a hydraulic cycle with less heat loss than in a thermodynamic steam cycle, for example, due to the virtual absence of condensation of a vapor, and with less loss than in a hydraulic cycle, due to the lower frictional characteristics of a gas. Moreover, a very important effect of the use of foam as the operating fluid medium is that the frictional heating of the foam in the compressor, as well as the frictional heat of the compressor itself, is carried along with the foam and made to do useful work in the thermodynamic aspect of the cycle.

In the embodiment of the invention illustrated in the schematic drawing, I have shown an excess of foam producing liquid at the bottom of both the high and low pressure reservoirs. Such a condition might exist when the system is idle for a long period of time or when first starting. However, upon the first movement of the gas, foam will be formed, and an excess of foam forming liquid may or may not be present.

The foam forming liquid may be any of the well known liquid compositions used in foam fire extinguishing apparatus; it may be produced by using a detergent in water; it may be a foaming lubricant; or it may be a combination of such media; or may be formed in any other manner.

While I have found foam under pressure in a system of this type to be remarkably stable, there will of course be some separation of the liquid and the gas as the bubbles become smaller on compression and the bubble walls become thicker. This action is slight, however, and is offset by an increase in number of bubbles due to agitation and turbulence in the compressor and in the piping system and valves.

It is of course possible to form the foam outside of the system and introduce it as foam at any desirable pressure into the system at any part of the cycle, and it is within the scope of my invention to do so.

In view of the absorption of the heat generated by the compression of the gas by the liquid wall of each globule or bubble, it is possible to more nearly approach a true isothermal compression and expansion cycle with my invention than it is with a cycle employing means for external cooling of the compressor and the gas, or a cycle employing means for injecting a cooling liquid with the gaseous fluid, which is later to be separated.

In fact it has been necessary, in order to obtain reasonable working pressures with known compression apparatus, to employ two or more stages of compression, with inter-coolers and after-coolers; and the energy thus converted into heat and removed by the cooling apparatus is wasted. However, as the result of my invention, single stage compression may be employed, and low end temperatures and low losses will ensue.

Numerous practical applications of the present invention suggest themselves. Thus, the invention may be utilized wherever pneumatic or hydraulic systems are used to perform work, as, for example, for the operation of pneumatic drills and hammers, for pneumatic or hydraulic power apparatus for the landing gear, bomb bay doors and brakes of aircraft, for machine tool motions, for winding machine operations, for variable speed transmissions for countless uses, for torque converters, and for many other uses.

Certain other advantages ensue from the employment of my invention in practice. Thus, for example, assuming that the previously described fluid system incorporating my invention is designed so that the temperature of the foam never rises to a point sufficient to vaporize any of the liquid, all of the energy introduced in the compressor C will be transmitted to the reservoir B, even the frictional losses of the compressor being carried along, this energy being stored in the foam, partly as pressure and partly as heat. Assuming further the existence of perfect insulation and perfect sealing of the system, the cycle is 100% efficient, as the frictional losses of the motor M and of the piping, as well as the frictional losses of the compressor, are retained within the cycle and stored as usable pressure and heat; but even without perfect insulation, a very high degree of efficiency may be had, as the foam itself is an excellent insulator, and as the loss of heat from the foam is consequently small.

The present invention also enables waste heat or other heat from outside sources to be introduced into the fluid system; and for this purpose the drawing shows a heat exchanger, which may be of any suitable construction. However, in view of the good heat insulating qualities of foam, the heat exchanger should be designed with this quality in mind, so that proper heat transfer will take place. It will be understood, of course, that the cycle of the present invention does not require the introduction of heat from outside sources, and that the use of a heat exchanger is accordingly optional.

From the foregoing description it will be apparent that I have provided an improved fluid power cycle for the transmission, conversion and/or storage of fluid energy, as well as an improved fluid system for utilization thereof.

It will also be seen that my invention has numerous advantages resulting from the use of a foam or foam-like medium as the operating fluid medium in a fluid system and in a fluid power cycle, the most important of which I have set out in the foregoing description. Other advantages, however, will be readily apparent to those skilled in the art of fluid energy transmission, conversion and storage.

While my invention has been described with more particular reference to the accompanying drawing, various modifications and substitutions may be made within the spirit and scope of the invention.

So far as my invention relates to a fluid power cycle employing a foam or foam-like medium as the operating fluid medium, I intend that the terms foam and foam-like medium be broadly interpreted so as to include any medium possessing the characteristics and advantages of a finely divided mixture of a gaseous fluid and a liquid.

I accordingly do not wish my invention to be limited save as defined in the appended claims, which in turn are to be accorded an interpretation commensurate with the broad aspects of the invention.

I claim:

1. A process for producing work, which process comprises establishing a foam-like medium consisting of a gaseous component, a liquid and a foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, and introducing the compressed medium into a work producing zone and expanding the gaseous component of the medium and utilizing the heat of compression of the medium to perform work.

2. A process for producing work, which process comprises establishing a foam-like medium consisting of a gaseous component, a liquid and a foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, supplying external heat to further heat the compressed medium without vaporizing the liquid thereof, and introducing the heated compressed medium into a work producing zone and expanding the gaseous component of the medium and utilizing the heat of the medium to perform work.

3. A continuous process for producing work by utilizing a large volume of a gaseous component, a smaller volume of liquid and a foaming agent confined in a closed system, which process comprises establishing a foam-like medium consisting of the gaseous component, the liquid and the foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, introducing the compressed medium into a work producing zone and expanding the gaseous component of the medium and utilizing the heat of compression of the medium to perform work, and recompressing the expanded medium.

4. A continuous process for producing work by utilizing a large volume of a gaseous component, a smaller volume of liquid and a foaming agent confined in a closed system, which process comprises establishing a foam-like medium consisting of the gaseous component, the liquid and the foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, supplying external heat to further heat the medium without vaporizing the liquid thereof, introducing the heated compressed medium into a work producing zone and expanding the gaseous component of the medium and utilizing the heat of the medium to perform work, and recompressing the expanded medium.

5. A continuous process for producing work by utilizing a large volume of a gaseous component, a smaller volume of liquid and a foaming agent confined in a closed system, which process comprises establishing a foam-like medium consisting of the gaseous component, the liquid and the foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, storing the compressed medium, withdrawing the stored compressed medium and introducing the same into a work producing zone and expanding the gaseous component of the medium and utilizing the heat of compression of the medium to perform work, storing the expanded medium, and withdrawing the stored expanded medium for recompression thereof.

6. A continuous process for producing work by utilizing a large volume of a gaseous component, a smaller volume of liquid and a foaming agent confined in a closed system, which process comprises establishing a foam-like medium consisting of the gaseous component, the liquid and the foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, supplying external heat to further heat the medium without vaporizing the liquid thereof, storing the heated compressed medium, withdrawing the stored heated compressed medium and introducing the same into a work producing zone, expanding the gaseous component of the medium in the work producing zone and utilizing the heat of the medium to perform work, storing the expanded medium, and withdrawing the stored expanded medium for recompression thereof.

7. A continuous process for producing work by utilizing a large volume of a gaseous component, a smaller volume of liquid and a foaming agent confined in a closed system, which process comprises establishing a foam-like medium consisting of the gaseous component, the liquid and the foaming agent wherein small volumes of the gaseous component are surrounded by thin walls of the liquid to form a myriad of finely subdivided bubbles to provide an elastic gas-like fluid, compressing the medium to thereby compress the gaseous component of the medium and cause the medium to absorb heat of compression without vaporizing the liquid thereof, supplying external heat to further heat the medium without vaporizing the liquid thereof, storing the heated compressed medium, withdrawing the stored heated compressed medium and introducing the same into a work producing zone at a predetermined rate, expanding the gaseous component of the medium in the work producing zone and utilizing the heat of the medium to perform work, storing the expanded medium, and withdrawing the stored expanded medium for recompression thereof.

HAROLD C. NOE.

REFERENCES CITED

The following references are of record in the file of this patent:

UNITED STATES PATENTS

| Number | Name | Date |
|---|---|---|
| Re. 14,955 | Crawford | Oct. 12, 1920 |
| 495,616 | Renwick | Apr. 18, 1893 |
| 732,908 | Thomson | July 7, 1903 |
| 866,437 | Davidson | Sept. 17, 1907 |
| 1,441,728 | Kent | Jan. 9, 1923 |
| 1,503,922 | Slater | Aug. 5, 1924 |
| 1,774,293 | Schottelius | Aug. 26, 1930 |
| 1,809,409 | Granger | June 9, 1931 |
| 2,247,238 | Johnston | June 24, 1941 |

FOREIGN PATENTS

| Number | Country | Date |
|---|---|---|
| 114,410 | Austria | Oct. 10, 1929 |

OTHER REFERENCES

Ser. No. 261,139, Waltenbauer (A.P.C.), published April 27, 1943.